United States Patent
Afferton et al.

(10) Patent No.: US 7,570,886 B1
(45) Date of Patent: Aug. 4, 2009

(54) NETWORK WITH OPTICAL BANDWIDTH ON DEMAND

(76) Inventors: Thomas S. Afferton, 15 Hughes Rd., Bridgewater, NJ (US) 08807; Martin Birk, 484 Woodland Ave., Belford, NJ (US) 07718; Kenneth A. Duell, 35 Citation Ct., Tinton Falls, NJ (US) 07724; Hossein Eslambolchi, 13826 Moon La., Los Altos Hills, CA (US) 94022; Kathleen A. Tse, 25 Ashley Dr., Holmdel, NJ (US) 07733; Simon S. Zelingher, 18 Opatut Ct., Morganville, NJ (US) 07751

( * ) Notice: Subject to any disclaimer, the term of this patent is extended or adjusted under 35 U.S.C. 154(b) by 517 days.

(21) Appl. No.: 10/798,696

(22) Filed: Mar. 11, 2004

Related U.S. Application Data

(66) Substitute for application No. 60/454,556, filed on Mar. 14, 2003.

(51) Int. Cl.
*H04J 14/00* (2006.01)
(52) U.S. Cl. .......................................... 398/45
(58) Field of Classification Search ............. 398/7, 398/10, 12, 17, 22, 30, 67; 370/236; 359/135
See application file for complete search history.

(56) References Cited

U.S. PATENT DOCUMENTS

| | | | | |
|---|---|---|---|---|
| 5,760,934 | A * | 6/1998 | Sutter et al. ..................... | 398/59 |
| 6,128,657 | A * | 10/2000 | Okanoya et al. ............. | 709/224 |
| 6,549,516 | B1 * | 4/2003 | Albert et al. ................. | 370/236 |
| 7,072,584 | B1 * | 7/2006 | Lichtman et al. .............. | 398/59 |
| 2002/0149820 | A1 * | 10/2002 | Liu ............................. | 359/135 |
| 2003/0152072 | A1 * | 8/2003 | Guild et al. ................. | 370/386 |
| 2004/0208560 | A1 * | 10/2004 | Gumaste et al. ............... | 398/59 |
| 2006/0275034 | A9 * | 12/2006 | Way et al. ..................... | 398/59 |

* cited by examiner

*Primary Examiner*—Richard Hjerpe
*Assistant Examiner*—Shaheda A Abdin

(57) ABSTRACT

A network arrangement where traffic elements of network nodes are programmable. A traffic element comprises electrically controllable transceiver pool having one or more ports that are coupled to an electrically controllable optical director that has all-optical information communication paths. The transceiver pool has one or more customer connection points in addition to the one or more connection points that connect to the optical director, and is adapted to couple a signal from any of the customer connection points to the optical director, at a particular wavelength. The choices for the specific coupling within the optical director and of the wavelengths are specified by control signals that are applied to the transceiver pool and to the optical director.

20 Claims, 4 Drawing Sheets

NETWORK WITH OPTICAL BANDWIDTH ON DEMAND

RELATED APPLICATION

This application is related to Provisional Application No. 60/454,556, filed Mar. 14, 2003, which is hereby incorporated by reference.

BACKGROUND OF THE INVENTION

An optical network can be broadly considered as one that includes nodes that accept, output, and/or redirect information channels (packets, or circuits), and transport facilities, for example, optical cables, that interconnect the nodes. The cable between nodes of a network may comprise only one fiber, or may have a large number of fibers.

FIG. 1 illustrates a segment of an optical network encompassing Chicago having a traffic element (TE) 101, Indianapolis having a traffic element 102, Pittsburgh having a traffic element 103, New York having a traffic element 104, Atlanta having a traffic element 105, and Philadelphia having a traffic element 106. It is noted that a cable between two cities need not consist of an uninterrupted span. For example, the cable from Indianapolis is shown to comprise a section from Indianapolis to a junction element, and another section from the junction element to Pittsburgh. A similar arrangement is shown for the span between Philadelphia (Phili) and New York city (NYC) and for the span between Atlanta and Phili. Although a junction element is not required for adding, or off-loading traffic, it is possible to change wavelengths within it and, therefore, a signal of a particular wavelength that flows through one section does not absolutely have to continue through the other segment in the same wavelength. It may be noted that in the context of this disclosure, the term "wavelength" means a signal that results when information is modulated onto an optical carrier that is relative pure; i.e., has a very narrow bandwidth. Signals of other wavelengths are separated sufficiently apart so that each wavelength can be culled out, if desired.

Currently, the process for establishing traffic carrying capacity between a pair of points contemplates simply managing the physical cable connections at the points, including intermediate junctions. Thus, in order to establish capacity between Chicago and Indianapolis, a cable needs to be physically connected that extends to the intended destination. FIG. 2 illustrates a traffic element that illustratively is used in Phili. Specifically, the traffic element 106 comprises an optical add/drop multiplexer (OADM) 116, and the cables from Pittsburgh, Atlanta, and NYC are connected to the OADM.

Router 126 is poised to place traffic onto the network, or to receive traffic from the network. Currently, in order to provision capacity from element 106 to any particular direction, for example, to NYC, circuitry must be provided at element 106 that converts electrical signals, and/or short-reach optical signals, to long-reach optical signals at a particular wavelength, and the developed optical signal must be coupled to the cable extending to NYC, for example with a coupler as shown in FIG. 2. To change the provisioning from NYC to, for example, Atlanta, the coupling had to physically be changed to couple the output signal of router 126 to the Atlanta cable, and the wavelength at which the signals are operating may have to be changed. Of course, capacity can be provided ab initio to all of the destinations, as shown in FIG. 2, but that is very expensive.

SUMMARY

The deficiencies of the prior art are overcome, and an advance is realized with a network arrangement where nodes of traffic elements that connect to the optical cables are programmable. Specifically, each traffic element comprises electrically controllable transceiver pool having one or more ports that are coupled to an electrically controllable optical director whose information communication paths are all-optical. The transceiver pool has one or more customer-side (CS) connection points in addition to the one or more optical-director-side (ODS) connection points that connect to the optical director, and is adapted to couple a signal from any of the customer connection point to any one of the intermediate connection points that are connected to the optical director, at a particular wavelength. The choices for the specific coupling within the optical director, and of the wavelengths that are operational at the ODS connection points are specified by control signals that are applied to the transceiver pool and to the optical director. Additional benefits are realized by providing for automatic control of more than one node of the network. For optical signals that are connected through the optical director at any traffic element, they can either pass through optically or be dropped to the transceiver pool, to be regenerated or change wavelength.

DETAILED DESCRIPTION

Figure 3:
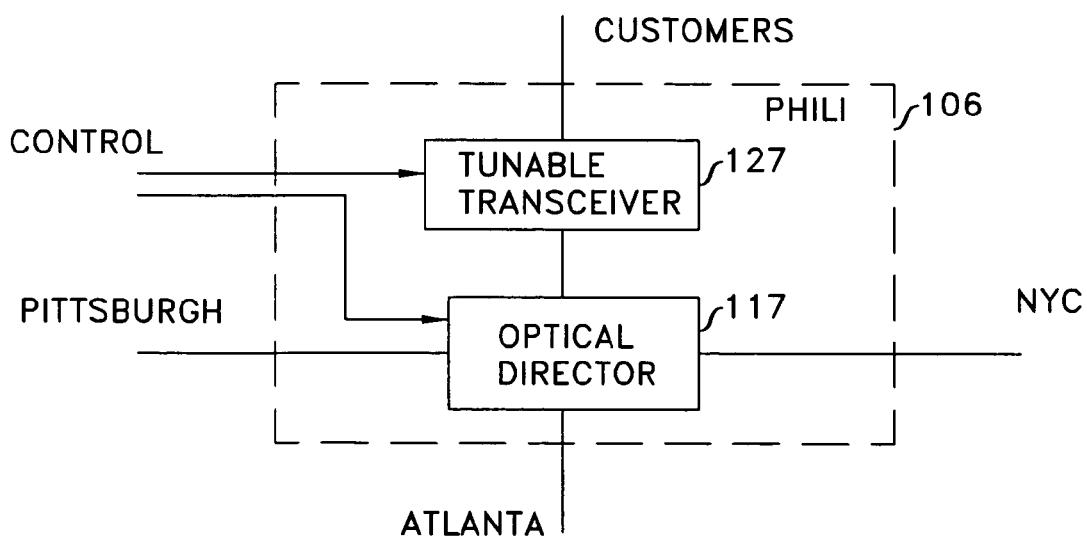
FIG. 3 presents an embodiment of a traffic element in accord with the principles disclosed herein.

FIG. 3 illustrates one embodiment in accord with the principles disclosed herein. It includes a tunable transceiver 127, which is a bi-directional transponder device that is tunable pursuant to an applied control signal. A first port of transceiver 127 is extended to customers, and a second port of transceiver 127 is coupled to optical director 117. Information applied to the first port is communicated to the second port, modulated onto a particular wavelength as specified by the control signal. Information appearing at the second port, when modulated onto the particular wavelength, is communicated to the first port.

It is possible for transceiver 127 to utilize a portion of the information that is received at a port, and to not communicate that portion to the other port—for example, error correction codes. It is also possible for a port to output information that was not injected at the other port, effectively creating information—for example, error correction codes. However, the primary function of transceiver 127 is to provide a signal to optical director 117 that communicates information that a customer wishes to transmit, in a format that can be usefully absorbed by the optical director; and conversely, to accept a signal from optical director 117, when it is appropriately modulated onto the particular wavelength, and to communicate information to a customer that is embedded in that optical director signal and is intended to be delivered to the customer. Therefore, in the context of this disclosure, the information transfer characteristics of tunable transceiver 127 are, at times, referred to as a communication of "substantially all of the information" from one port to the other port.

Transceiver 127 may comprise uni-directional tunable transponders, or two uni-directional tunable transponders that are connected to provide a signal path in each direction. Tunable transponders are well known in the art. Optical director 117 is a device where the information flows essentially through only optical paths. That is, save for a preprocessing element that, if necessary, converts an electrical signal to an optical signal, the paths through which information flows is all-optical. As depicted in FIG. 3, the optical director can comprise a conventional tunable OADM.

Figure 4:
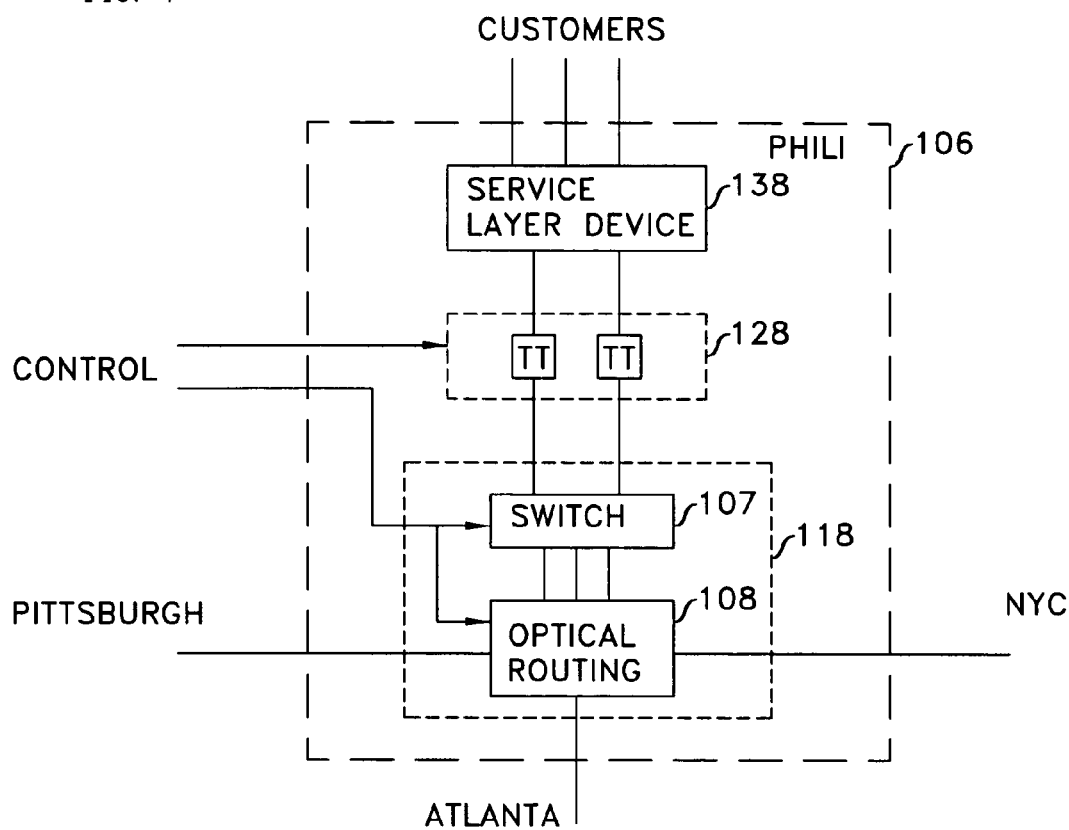
FIG. 4 presents another embodiment of a traffic element in accord with the principles disclosed herein.
Figure 5:
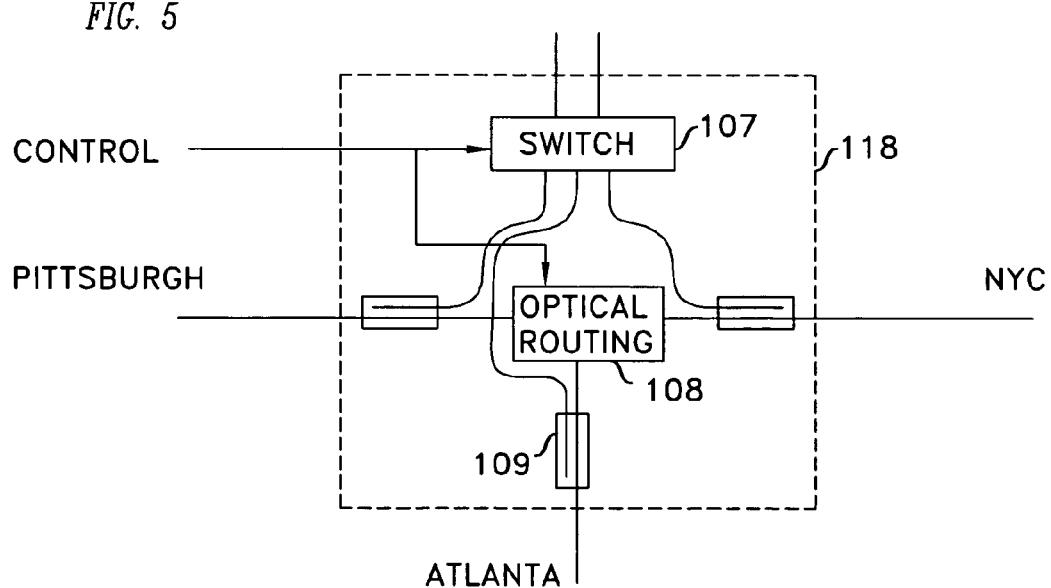
FIG. 5 illustrates one embodiment of an optical routing element within the optical director.

FIG. 4 shows a more robust arrangement, which includes a service layer device 138, such as a router, or a multiplexer, that outputs a plurality of signals to a plurality of connection points. Signals at those connection points are coupled to tunable transceiver 128 that comprises a pool of tunable transceiver (e.g., bi-directional) elements TT, each of which couples one connection point on the customer side (i.e., from a signal flow standpoint, closer to the customers) to one connection point of the optical director side (i.e., from a signal flow standpoint, closer to the optical director). Henceforth, the former are termed customer-side, or CS, connection points, and the latter are termed optical director side, or ODS connection points.

It should be noted that in the context of this disclosure, the term "connection point" intends to convey the notion of a logical connection point rather than a physical terminal or a port of a device. The concept is that tunable transceiver 128, or more specifically, the individual tunable transceiver elements of transceiver 128, may be integrated into the optical director without departing from the spirit of the invention, which case the ODS connection points may not be physically ascertainable or accessible to a crafts person. Correspondingly, the individual tunable transceiver elements of transceiver 128 may be integrated into the service layer device (such as a router), in which case the CS connection points may not be physically ascertainable or accessible to a crafts person.

Element 118 is not unlike optical director 117, except that it is adapted to interact with more than one ODS connection point. One implementation of element 118, which is shown in FIG. 4, comprises a switch 107 that, on one side thereof it is coupled to the ODS connection points, and on the other side thereof it is coupled to the optical cables that extend from optical routing element 108 (e.g., an OADM) to Pittsburgh, Atlanta, and NYC, via conventional optical couplers 109.

One important attribute of the network nodes disclosed herein is that they are electrically controllable so that there is essentially total control over the signal channels that are established, with any selected wavelength granularity, between the plurality of a node's ports.

One consequence of this attribute is that it is possible to provision the individual nodes of a network with due consideration of the entire network and to, thereby, operate the network in a more efficient manner. Another consequence of this attribute is that a network can be provisioned as needs for increased or reduced capacities arise. Yet another consequence of this attribute is the ability to automatically re-provision a network when a failure occurs, so as to circumvent the failure and continue to provide service.

Figure 1:
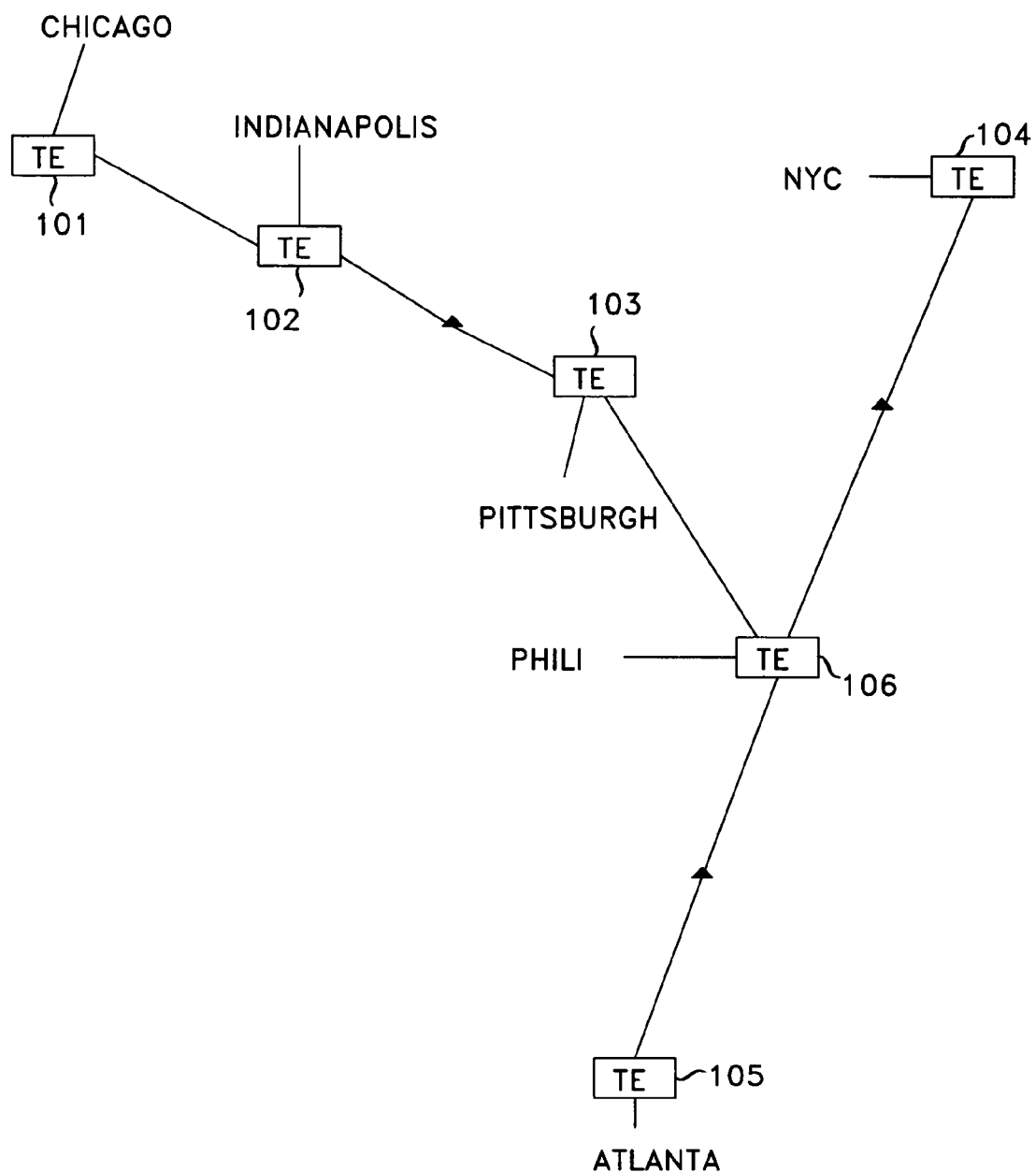
FIG. 1 presents a network segment.
Figure 2:
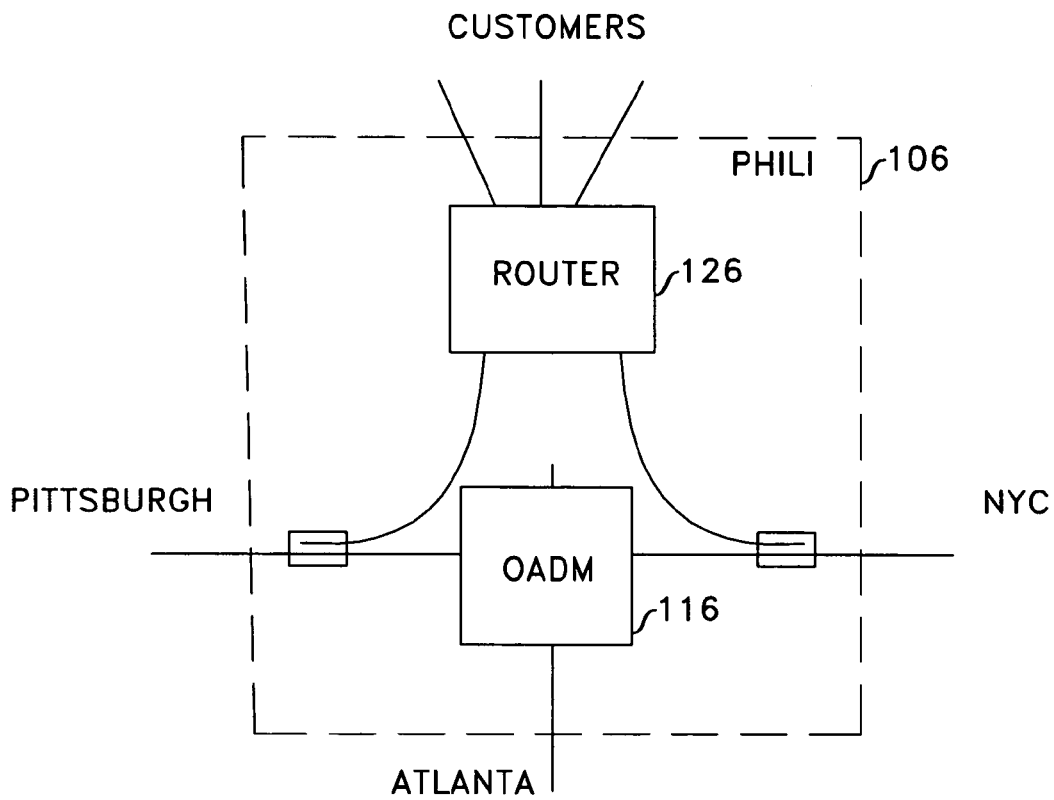
FIG. 2 illustrates a prior art arrangement for a traffic element that has optical cables extending to three remote destinations.

Such automatic provisioning is made possible by including a mechanism for communicating control information throughout the controlled network. This can be accomplished with in-band signaling, or out-of-band signaling that is embedded within the FIG. 1 network—i.e., the control signals flow through the cables that interconnect the nodes, or it can be accomplished with a separate and distinct network that is coupled to the FIG. 1 network. This arrangement is depicted in FIG. 6, which includes a management network 200 that is coupled to each of communication network 100, which encompasses nodes 101-106.

In the context of this disclosure, separate, or distinct, networks means that the networks are functionally dedicated to primarily different classes of signals. For example, one network primarily carries customer signals, whereas the other network carries primarily network control signals.

Figure 6:
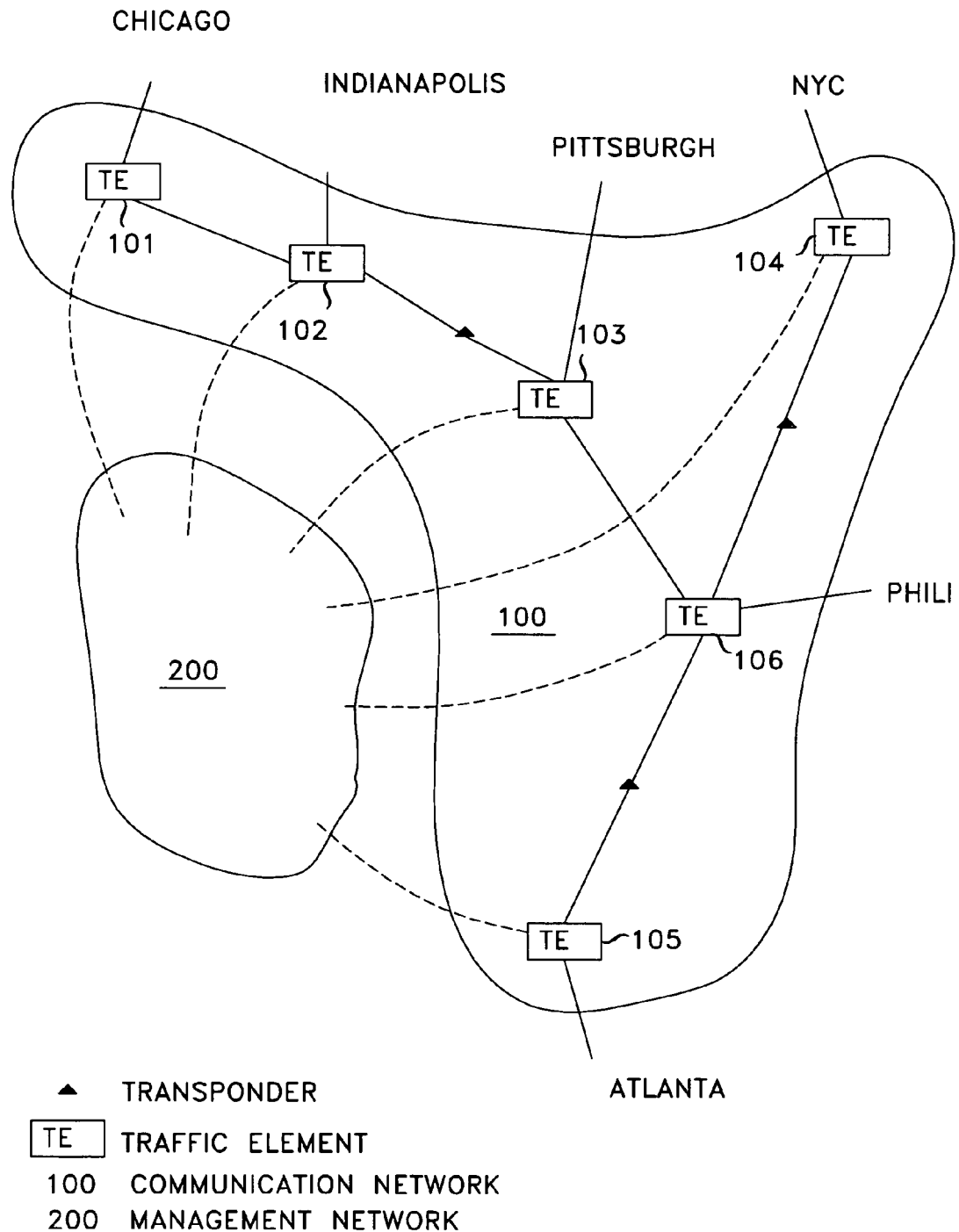
FIG. 6 shows an arrangement that includes a distinct management network.

In the FIG. 6 arrangement, network 200 has a centralized manager that communicates with each of the nodes in communication network 100, and it thus directs the node's provisioning. The task of choosing the provisioning nodes 101-106 is a classic resource allocation task, which the centralized manager can execute with the aid of commercially available software that executes well-known methods. Of course, the network's provisioning may be distributed; for example, incrementally implemented as the needs change.

Although a number of different embodiments are illustrated herein, it should be understood that various different embodiments can be employed, and various enhancements can be incorporated without departing from the spirit and scope of this invention, which is defined in the claims below. For instance, optical signals that arrive at a traffic element and which are destined to pass through the optical director can either pass through directly, or be routed by the optical director to the transceiver pool, to be "dropped" by a transponder therein, regenerated, and reapplied to the optical director via another transponder. In the application of the regenerated signal to the optical director, the signal's wavelength can be modified from that with which the signal arrived. Thus, for example, signals from Pittsburgh that are intended for NYC and which pass through the Philadelphia traffic element can be routed to transceiver 128, or even to service layer device 138, for regeneration or for regeneration with attendant change in the signal's wavelength, before being reapplied to optical director 118 for routing to the NYC optical cable.

The invention claimed is:

1. A network arrangement comprising nodes and optical links interconnecting the nodes, characterized in that at least one node comprises:
   a transceiver pool that includes
   a plurality of transceiver modules, each having a port A and a port B,
   a plurality of distinct optical connection points for coupling to customer equipment (Cs-CPs), each connected to said port A of one of said transceiver modules, and
   a plurality of distinct connection points (OD-CPs), each connected to said port B of one of said transceiver modules;
   with each transceiver module interconnected between one of said CS-CPs and one of said OD-CPs, and each transceiver module of said plurality of transceiver modules configured to modulate information provided by a customer to its CS-CP onto an optical carrier of a wavelength specified by a control signal, and to apply the modulated optical carrier to its OD-CP; and to demodulate an optical signal received from its OD-CP, to derive therefrom information that was modulated on an optical carrier signal of said specified wavelength, and to deliver the demodulated information to it its CS-CP; and an optical director element that includes a plurality of local connection points that are each coupled to a different one of said OD-CPs, and at least two long-haul optical connection points, each connected to a fiber of a different one of said links and configured to accept an information signal as well as to deliver an information signal, where optical signals flowing through said local connection points and through said long-haul connection points are routed within said optical director solely in optical form, under control of an applied electrical control signal.

2. The network of claim 1 where said control signal that affects the transceiver pool and said control signal that affects the optical director element are unrelated to any network fault indication.

3. The network of claim 1 where said control signal that affects the transceiver pool and said control signal that affects the optical director element are related or unrelated to any network fault indication.

4. The network of claim 1 further comprising a service layer device that is interposed between customer signals and the CS connection points.

5. The network of claim 1 where said service layer device performs a routing, or a multiplexing function.

6. The network of claim 1 where signal at a CS connection point is electrical.

7. The network of claim 1 where signal at a CS connection point is optical.

8. The network of claim 1 where said optical director comprises a switch connected to said local ports; and an optical routing element connected to said switch and to said other ports.

9. The network of claim 1 further comprising a management network for communicating said control signals.

10. The network of claim 9 where the management network is distinct from said network.

11. The network of claim 1 further including in-band control signals that flow through said network to provision nodes of said network.

12. The network of claim 1 further including out-of-band control signals that flow through said network to provision nodes of said network.

13. The network of claim 1 where said transceiver pool is embedded in said optical director.

14. A method for controlling a network that includes nodes, and links that interconnect the nodes, where a node of the nodes executes a process comprising the steps of:

provisioning a tunable transceiver of said node to communicate substantially all of the information of an applied signal of a customer to a local connection point that is coupled to a controllable optical director of said node, where the communicated information is modulated onto a wavelength specified by a control signal applied to said tunable transceiver, an optical signal that carries data modulated onto a carrier at said wavelength and which arrives at said local connection point from said optical director is demodulated and provided to said customer, and control signal is other than indicative of a failure condition; and provisioning said controllable optical director to transfer bi-directional optical signals at said local connection point that have said specified wavelength to one of at least two long-haul ports of said optical director that is specified by a control signal applied to said optical director, where each of said long-haul ports is configured to carry signals from a different link of said links to said optical director, and from said optical director to said respective different link, said transfer being via essentially all-optical communication paths within said first controllable optical director.

15. The method of claim 14 where the provisioning of said tunable transceiver to communicate substantially all of the information of an applied customer signal to said first bi-directional local connection point does not communicate error control signals contained in said information.

16. The method of claim 14 where the control signals are applied to said first node in response to a request for provisioning from another node of said network or from an entity that has management control over the network.

17. The method of claim 16 where the request arrives from said entity pursuant to a process that rearranges provisioning in said network.

18. The method of claim 17 where the rearranging of provisioning is in response to changes in network load conditions.

19. The method of claim 18 where the changes in network load conditions arise from network faults.

20. The method of claim 14 where the control signals are applied in response to a fault condition detected in the network.

* * * * *